(12) United States Patent
Nathan et al.

(10) Patent No.: US 8,187,740 B2
(45) Date of Patent: May 29, 2012

(54) 3-D MICROBATTERIES BASED ON INTERLACED MICRO-CONTAINER STRUCTURES

(75) Inventors: Menachem Nathan, Tel Aviv-Yafo (IL); Emanuel Peled, Even Yehuda (IL); Diana Golodnitsky, Rishon Lezion (IL); Vladimir Yufit, Ashdod (IL); Tania Ripenbein, Netanya (IL)

(73) Assignee: Tel Aviv University Future Technology Development L.P., Tel Aviv (Yafo) (IL)

( * ) Notice: Subject to any disclaimer, the term of this patent is extended or adjusted under 35 U.S.C. 154(b) by 945 days.

(21) Appl. No.: 11/568,182

(22) PCT Filed: Apr. 20, 2005

(86) PCT No.: PCT/IL2005/000414
§ 371 (c)(1),
(2), (4) Date: Sep. 22, 2008

(87) PCT Pub. No.: WO2005/101973
PCT Pub. Date: Nov. 3, 2005

(65) Prior Publication Data
US 2009/0142656 A1    Jun. 4, 2009

Related U.S. Application Data

(60) Provisional application No. 60/566,205, filed on Apr. 27, 2004, provisional application No. 60/590,833, filed on Jul. 22, 2004.

(51) Int. Cl.
*H01M 2/18* (2006.01)
*B05D 5/12* (2006.01)

(52) U.S. Cl. ........................................ 429/129; 427/115
(58) Field of Classification Search ................... 429/129
See application file for complete search history.

(56) References Cited

U.S. PATENT DOCUMENTS

| | | |
|---|---|---|
| 3,661,644 A | 5/1972 | Arrance |
| 4,659,637 A | 4/1987 | Nelson et al. |
| 4,906,536 A | 3/1990 | Simonton |
| 5,162,178 A | 11/1992 | Ohsawa et al. |
| 5,338,625 A | 8/1994 | Bates et al. |
| 5,567,210 A | 10/1996 | Bates et al. |
| 6,197,450 B1 * | 3/2001 | Nathan et al. .............. 429/236 |

(Continued)

FOREIGN PATENT DOCUMENTS

| | | |
|---|---|---|
| DE | 1596248 | 3/1971 |
| EP | 0769822 | 4/1997 |
| WO | 2004036668 | 4/2004 |
| WO | 2005101973 | 11/2005 |

OTHER PUBLICATIONS

U.S. Appl. No. 60/590,833, filed Jul. 22, 2004.

(Continued)

*Primary Examiner* — Patrick Ryan
*Assistant Examiner* — Brent Thomas
(74) *Attorney, Agent, or Firm* — Fish & Richardson P.C.

(57) ABSTRACT

An electrical energy storage device (20,70) includes a substrate (22), which is formed so as to define a multiplicity of micro-containers separated by electrically-insulating and ion-conducting walls (32). A first plurality of anodes (A) is disposed in a first subset (24) of the micro-containers, and a second plurality of cathodes (C) is disposed in a second subset (26) of the micro-containers. The anodes and cathodes are arranged in an interlaced pattern.

23 Claims, 5 Drawing Sheets

U.S. PATENT DOCUMENTS

| | | |
|---|---|---|
| 6,260,388 B1 | 7/2001 | Borrelli et al. |
| 6,270,714 B1 | 8/2001 | Azran et al. |
| 6,300,709 B1 | 10/2001 | DeVoe et al. |
| 6,495,283 B1 | 12/2002 | Yoon et al. |
| 6,521,149 B1 | 2/2003 | Mearini et al. |
| 6,610,440 B1 | 8/2003 | LaFollette et al. |
| 6,645,675 B1 | 11/2003 | Munshi |
| 6,720,273 B1 | 4/2004 | Becker et al. |
| 2004/0175626 A1 | 9/2004 | Dasgupta et al. |

OTHER PUBLICATIONS

U.S. Appl. No. 60/566,205, filed Apr. 27, 2004.
Hashikawa, et al., "Lithium Isotope Effect Accompanying Chemical Insertion of Lithium into Graphite", Zeitschrift fur Naturforschung 57a (2002), pp. 857-862.
U.S. Appl. No. 60/511,382, filed Oct. 14, 2003.
Li, et al., Microfabrication of thermoelectric materials by silicon molding process Sensors and Actuators A, vol. 108, 2003, pp. 97-102.
Owen, "Ionically conducting glasses", Solid State Batteries, Sequeira and Hooper, Nato Science Series E, Springer, Oct. 1985.
Song, et al., "Review of Gel-Type Polymer Electrolytes for Lithium-Ion Batteries", Journal of Power Sources, vol. 77, 1999, pp. 183-197.
Heckele and Schomburg, "Review on Micromolding of Thermo plastic Polymers", Journal of Micromechanics and Microengineering,/ vol. 14, 2004, pp. R1-R14.
Long, et al., "Three Dimensional battery architectures", Chemical Review, vol. 10, No. 104, Oct. 2004, pp. 4463-4492.
Hart, et al., "3-D Microbatteries", Electrochemistry communications, vol. 5, 2003, pp. 120-123.
Kleimann, et al., Formation of wide and deep pores in silicon by electrochemical etching, Materials Science and Engineering B, vols. 69-70, 2000, pp. 29-33.

* cited by examiner

3-D MICROBATTERIES BASED ON INTERLACED MICRO-CONTAINER STRUCTURES

CROSS-REFERENCE TO RELATED APPLICATIONS

This application claims the benefit of U.S. Provisional Patent Application 60/566,205, filed Apr. 27, 2004, and of U.S. Provisional Patent Application 60/590,833, filed Jul. 22, 2004. It is related to PCT Patent Application PCT/IL2004/000945, filed Oct. 14, 2004. These related applications are assigned to the assignee of the present patent application, and their disclosures are incorporated herein by reference.

FIELD OF THE INVENTION

The present invention relates generally to electrical energy sources, and particularly to three-dimensional (3-D) microbatteries.

BACKGROUND OF THE INVENTION

Miniature, two-dimensional thin-film microbatteries are known in the art. For example, U.S. Pat. Nos. 5,338,625 and 5,567,210, whose disclosures are incorporated herein by reference, describe a thin-film microbattery used as a backup or primary integrated power source for electronic devices. The battery includes a lithium anode, an electrochemically-stable electrolyte and a vanadium-oxide cathode. The battery is fabricated directly onto a semiconductor chip, onto the semiconductor die or onto a portion of the chip carrier.

U.S. Pat. No. 6,610,440, whose disclosure is incorporated herein by reference, describes microscopic batteries that are integratable or integrated with micro-electromechanical (MEMS) systems or other microscopic circuits. The inventors describe closed system microscopic batteries used for internal storage of electricity using interval reactants. The batteries comprise microscopic electrodes, electrolyte and a reservoir for the electrolyte.

A three-dimensional thin-film microbattery is described in U.S. Pat. No. 6,197,450, whose disclosure is incorporated herein by reference. Thin-film micro-electrochemical energy storage cells (MEESC) such as microbatteries and double-layer capacitors (DLC) are described. The energy storage cells comprise two thin layer electrodes, an intermediate thin layer of a solid electrolyte and an optional fourth thin current collector layer. The layers are deposited in sequence on a surface of a substrate. The substrate comprises multiple through cavities of arbitrary shape, with high aspect ratio, which increase the total electrode area per volume ratio.

3-D microbatteries are also described by Long et al., in "Three-Dimensional Battery Architectures," Chemical Review, volume 10, number 104, October, 2004, pages 4463-4492, which is incorporated herein by reference.

Geometric configurations of 3-D microbatteries are described by Hart et al., in "3-D Microbatteries," Electrochemistry Communications, volume 5, 2003, pages 120-123, which is incorporated herein by reference. The paper presents finite-element simulations showing current and potential distribution for several cathode-anode array configurations.

A method for producing arrays of cavities in silicon is described by Kleimann et al., in "Formation of Wide and Deep Pores in Silicon by Electrochemical Etching," Materials Science and Engineering B, volumes 69-70, 2000, pages 29-33, which is incorporated herein by reference. Another process for producing micro-cavity arrays is described by Li et al., in "Microfabrication of Thermoelectric Materials by Silicon Molding Process," Sensors and Actuators A, volume 108, 2003, pages 97-102, which is incorporated herein by reference. The authors describe a process for fabricating thermoelectric micro-modules with densely aligned fine scale and high aspect ratio elements.

SUMMARY OF THE INVENTION

Embodiments of the present invention provide improved 3-D microbatteries that provide superior energy density and capacity, in comparison to microbatteries known in the art.

The disclosed microbatteries comprise two sets of high aspect-ratio micro-containers formed in a substrate. The micro-containers are filled with appropriate anode and cathode materials and used as the electrodes of the microbattery. The anodes and cathodes are arranged in an interlaced pattern and are separated by walls of substrate material.

The walls of the substrate that separate the micro-containers are processed to enhance their ion-conductivity and electrical insulation. In some embodiments, multiple microscopic pores are formed in the separating walls, so as to enhance ion-conductivity between the anodes and cathodes. A method for forming a porous silicon substrate using metal-assisted chemical etching is described hereinbelow. In some embodiments, the porous walls are also oxidized to increase their electrical insulation. The porous structure is filled with an ion-conducting and electrically insulating substance, such as a liquid electrolyte, a composite polymer electrolyte (CPE) or a hybrid polymer electrolyte (HPE).

In some embodiments, the anode and cathode micro-containers are formed in opposite surfaces of the substrate. This configuration simplifies the process of filling the micro-containers and prevents mixing of anode and cathode materials.

In other embodiments, all micro-containers are formed in a single side of the substrate. In this configuration, a specially-designed mask and/or a temporary filling process prevents mixing of different electrode materials.

In an alternative embodiment, the micro-containers are formed by micro-molding or micro-embossing a thin and mechanically-stable porous separator membrane into recesses in the substrate material.

In some embodiments, the disclosed 3-D microbatteries are used to power a microelectronic circuit that is integrated together with the microbattery on the same substrate.

In comparison to other 3-D microbatteries known in the art, the microbatteries described herein provide superior energy density. The fabrication processes described below are relatively straightforward to implement. Furthermore, the disclosed configurations enable the use of a large variety of anode and cathode materials, as will be demonstrated below. Similarly, the disclosed configurations enable the use a variety of electrolyte materials, including liquid electrolytes.

The principles of the present invention can be used to fabricate other miniature energy storage devices, such as capacitors, using interlaced sets of electrodes separated by a porous separator.

There is therefore provided, in accordance with an embodiment of the present invention, an electrical energy storage device, including:

a substrate, which is formed so as to define a multiplicity of micro-containers separated by electrically-insulating and ion-conducting walls; and a first plurality of anodes disposed in a first subset of the micro-containers, and a second plurality of cathodes disposed in a second subset of the micro-containers, the anodes and cathodes arranged in an interlaced pattern.

In a disclosed embodiment, the walls have pores formed therethrough. Additionally or alternatively, the walls include a porous separator membrane applied to the substrate. Further additionally or alternatively, at least some of the pores are filled with an electrolyte. In some embodiments, the electrolyte includes at least one of a liquid electrolyte, a hybrid polymer electrolyte (HPE) and a composite polymer electrolyte (CPE).

In another embodiment, the pores are formed using at least one of an electrochemical etching process and a chemical etching process.

In yet another embodiment, the substrate includes at least one of silicon, gallium arsenide, silicon carbide, a ceramic material, a thermoelastic polymer, a thermoplastic polymer, a surface-oxidized metal, a sodium-ion conductor and a lithium-ion conductor.

In still another embodiment, the electrical energy storage device includes one of a lithium and a lithium-ion microbattery.

In another disclosed embodiment, the first and second subsets of the micro-containers are formed in a single surface of the substrate. In an alternative embodiment, the first and second subsets of micro-containers are formed in respective opposite surfaces of the substrate. Additionally or alternatively, the substrate includes a middle wafer in which the first and second subsets of micro-containers are formed, and at least one side wafer coupled to a surface of the middle wafer so as to form a bottom side of at least one of the subsets of micro-containers.

In a disclosed embodiment, the walls are at least partially oxidized.

In another embodiment, the device includes at least one current collector coupled to at least one of the plurality of anodes and the plurality of cathodes. Additionally, the at least one current collector includes one of a metallic foil and a deposited metallic layer.

In yet another embodiment, the anodes and cathodes are disposed using at least one of a pasting process, a vacuum-assisted insertion process and a thick-film deposition process.

In still another embodiment, the micro-containers have at least one of a square, a triangular, a hexagonal and a round shape. In another embodiment, the micro-containers have a depth-to-diameter ratio greater than one. In yet another embodiment, the multiplicity of micro-containers are arranged in at least one of a square, a triangular and a hexagonal grid pattern. In another embodiment, the multiplicity of micro-containers are formed using at least one of an etching process and a lithographic etching process.

In a disclosed embodiment, the anodes include lithium insertion compounds including at least one of carbon, graphite, lithium alloys and lithium. In another embodiment, the cathodes include at least one of $MoS_2$, $FeS_2$, $WS_2$, $LiCoO_2$, $LiNiO_2$ and $Li_{1+x}Mn_{2-y}O_4$ material.

There is additionally provided, in accordance with an embodiment of the present invention, a microelectronic device, including:
a substrate;
a microcircuit disposed on the substrate; and
an electrical energy storage device disposed in the substrate and coupled to provide electrical power to the microcircuit, the storage device including:
a multiplicity of three-dimensional micro-containers formed in the substrate, separated by electrically-insulating and ion-conducting walls; and
a plurality of anodes disposed in a first subset of the micro-containers, and a plurality of cathodes disposed in a second subset of the micro-containers, the anodes and cathodes arranged in an interlaced pattern.

There is also provided, in accordance with an embodiment of the present invention, a method for constructing an electrical energy storage device, including:
forming a multiplicity of three-dimensional micro-containers in a substrate, so that the micro-containers are separated by electrically-insulating and ion-conducting walls; and
disposing a first plurality of anodes in a first subset of the micro-containers, and a second plurality of cathodes in a second subset of the micro-containers, the anodes and cathodes arranged in an interlaced pattern.

The present invention will be more fully understood from the following detailed description of the embodiments thereof, taken together with the drawings in which:

DETAILED DESCRIPTION OF EMBODIMENTS

Double-Sided Microbattery Structure

Figure 1:
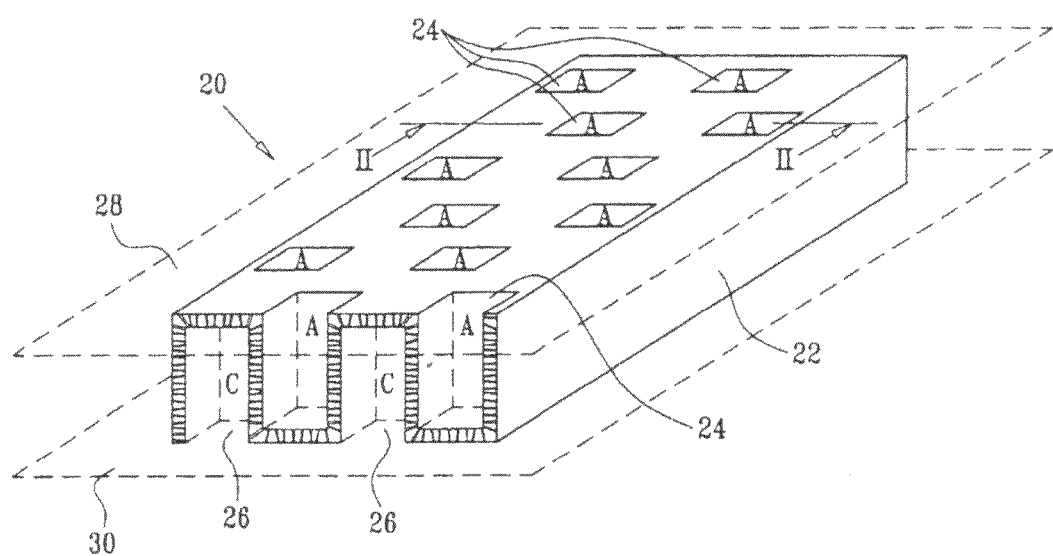
FIG. 1 is a pictorial, schematic illustration of a microbattery, in accordance with an embodiment of the present invention.

FIG. 1 is a pictorial, schematic illustration of a microbattery 20, in accordance with an embodiment of the present invention. Microbattery 20 is formed in a substrate 22. The substrate is typically a semiconductor wafer. The typical thickness of the silicon wafer is in the range of 100-800 microns, although the methods described below can be used to fabricate microbatteries in wafers of any thickness. In one embodiment, substrate 22 comprises silicon. Alternatively, other substrate materials may be used, including semiconductor materials such as gallium arsenide (GaAs) and silicon carbide (SiC); ceramic materials such as alumina; glasses; plastics such as various thermoelastic and thermoplastic polymers; surface-oxidized metal substrates; and other suitable materials. In other embodiments, the substrate can comprise a solid ion-conductor such as a sodium-ion or lithium-ion conductor. (The use of such materials is described, for example, by Owen in "Ionically Conducting Glasses" and by Armand in "Ionically conductive Polymers." Both papers appear in "Solid State Batteries," Sequeira and Hooper (editors), Nato Science Series E, Springer, October 1985, which is incorporated herein by reference.) In some embodiments, the microbattery comprises a lithium or a lithium-ion battery.

The electrodes of microbattery 20 are disposed in two sets of cavities, referred to herein as "micro-containers," formed in substrate 22. A first set of micro-containers 24 is formed in a first side of substrate 22. A second set of micro-containers 26 is formed in the opposite side of the substrate. Micro-containers 24 are used as multiple anodes of the micro-battery, as will be described below. Micro-containers 26 are used as multiple cathodes. (The anode and cathode micro-containers are denoted "A" and "C" in the figure, respectively. The anodes and cathodes are collectively referred to as "electrodes.")

The two sets of micro-containers are typically arranged in a periodic, interlaced pattern in substrate 22. (The interlaced pattern is sometimes referred to as an "interdigitated" pattern.) In the example of FIG. 1, the anodes and cathodes are arranged in an interlaced pattern on a square grid, in which each electrode has four nearest neighbors of the opposite polarity (i.e., each cathode has four anodes as nearest neighbors, and vice versa.) The majority of the electrochemical reaction occurs between such nearest neighbors of opposite polarities. In other embodiments, the anodes and cathodes can be arranged in other patterns, such as the configurations described in the Hart paper cited above. The Hart paper describes several alternative arrangements of micro-containers, including square, triangular and hexagonal grids. Each arrangement is shown to be optimized for a particular performance requirement of the microbattery, such as energy capacity, power, and current uniformity across the electrodes. In general, the number of cathodes need not be equal to the number of anodes. Furthermore, each electrode can have any number of anodes and any number of cathodes as nearest neighbors.

The micro-containers in the example of FIG. 1 are square in shape. In alternative embodiments, other suitable micro-container shapes, such as triangular, rectangular, hexagonal or round micro-containers can be used. The characteristic width or diameter of the micro-containers typically ranges from several microns up to several tens of microns. The total number of micro-containers in a typical microbattery can vary from several hundreds to several tens of thousands, depending on the micro-container width, the wall thickness and the electrical specifications of the battery. Typically, the micro-containers have a high aspect ratio, i.e., their depth is significantly larger than their width or diameter. In general, the micro-containers need not all have identical size.

The two sets of micro-containers 24 and 26 can be fabricated using any of several techniques known in the art. For example, the Kleimann paper cited above describes an electrochemical etching method for forming cavities in a silicon substrate. U.S. Pat. No. 6,197,450 cited above describes several alternative methods for etching cavities in substrate materials. Another example, referred to as a "dry etching" method, is an inductive-coupled plasma (ICP) process developed by Robert Bosch, GmbH (Stuttgart, Germany). The ICP process is described, for example, in U.S. Pat. No. 6,720,273, whose disclosure is incorporated herein by reference. Any other suitable method, such as etching and/or lithography methods, can likewise be used to form the two sets of micro-containers 24 and 26. Typically, the walls separating between the micro-containers are etched to a thickness of several microns. The micro-container formation process is stopped before the cavities penetrate the opposite surface of the substrate, typically leaving a bottom thickness in the range of 1-100 microns, preferably in the range of 10-50 microns. In some embodiments, the walls of substrate 22 that separate the micro-containers are rendered porous, as will be explained below. The bottom of each sub-set of micro-containers may be made totally or only partially porous, depending on its thickness relative to the thickness of the separating walls between the micro-containers.

In an alternative embodiment, the interlaced structure of micro-container sets is fabricated by using two or more wafers. For example, the interlaced structure can be fabricated from three wafers. A middle wafer is etched or otherwise processed to comprise the two sets of micro-containers, which in this configuration are allowed to penetrate through its entire thickness. Two side wafers are fabricated. A first side wafer comprises holes that match micro-container set 24. A second side wafer comprises holes that match micro-container set 26. The first side wafer forms the solid bottom for micro-container set 26, and the second side wafer forms the solid bottom for micro-container set 24. The three wafers are bonded together to form the 3-D double-sided micro-container structure shown in FIG. 1.

Micro-containers 24 are filled with a suitable anode material and serve as the anodes of microbattery 20. Similarly, micro-containers 26 are filled with a suitable cathode material and serve as the cathodes of the microbattery. Several filling techniques known in the art can be used to fill the electrodes with electrode materials. For example, pasting methods, pressure-filling methods, casting methods and vacuum-assisted methods can be used. Any suitable electrode materials known in the art can be used. Several exemplary microbatteries are described in detail hereinbelow, including a description of the specific electrode materials.

In some embodiments, after filling the micro-containers with electrode materials, all anodes are electrically connected to an anode current collector 28. Similarly, all cathodes are connected to a cathode current collector 30. The two current collectors comprise metallic layers applied to the surfaces of substrate 22. The current collectors may comprise a thin metallic foil, such as copper foil, or a thin metallic film deposited on substrate 22. Current collectors 28 and 30 comprise the voltage terminals of microbattery 20, and are connected using suitable wiring to the circuitry powered by the microbattery.

In other embodiments, one or both current collectors can be omitted. Typically, when either the anodes or cathodes are sufficiently electrically-conductive, the respective current collector can be omitted. One possible method of using the electrodes as current collectors is to allow electrode material to overflow out of the micro-containers and form a conductive layer on the surface of the substrate, as part of the electrode filling process. This conductive layer interconnects the electrodes and functions as a current collector.

Figure 2:
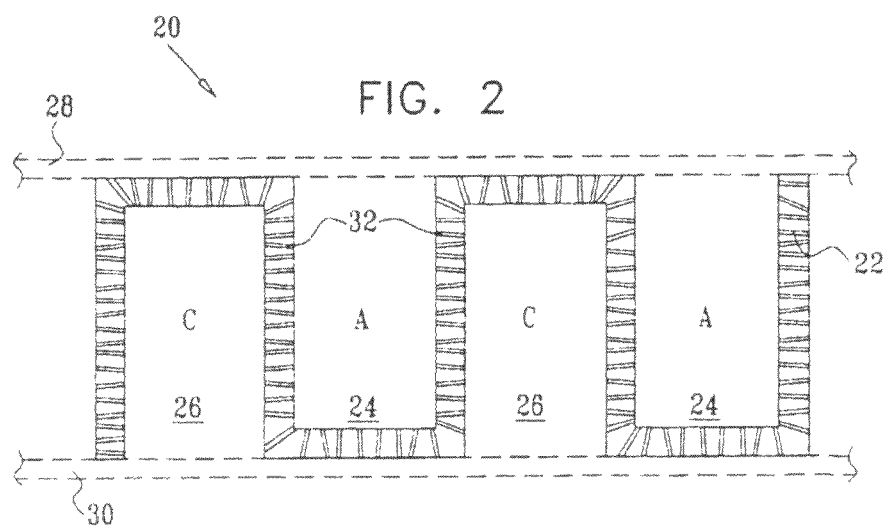
FIG. 2 is a schematic, sectional view of a microbattery, in accordance with an embodiment of the present invention.

FIG. 2 is a schematic, sectional view of microbattery 20, in accordance with an embodiment of the present invention. The view shown in FIG. 2 is a vertical cross section of the microbattery, in a plane located at markers denoted "II" in FIG. 1 above. The cross-sectional view shows substrate 22 separating anode micro-containers 24 from cathode micro-containers 26. After cavities 24 are filled with anode material, the anodes can be seen to have an electrical contact with current collector 28. The anodes are electrically insulated from current collector 30 by the substrate material. Similarly, the cathodes have an electrical contact with current collector 30 and are isolated from current collector 28 by the substrate material.

In some embodiments, parts of the substrate are further processed to enhance their ion conductivity and/or electrical insulation. Ion conductivity between the anodes and the cathodes is, of course, an important part of the electrochemical reaction producing the current in microbattery 20. In one embodiment, walls 32 separating between the micro-containers are rendered porous to enable ions to flow through them. Exemplary processes for producing pores in substrate 22 are described hereinbelow.

The porous walls typically comprise nanometric pores (typically several tens to several hundreds of nanometers in diameter). The walls are then filled with an ion conducting and electrically insulating substance. In some embodiments, the substance comprises a liquid electrolyte that impregnates the porous structure and fills the pores. In other embodiments, the substance comprises a hybrid polymer electrolyte (HPE) or a composite polymer electrolyte (CPE). Some exemplary electrolyte materials, and exemplary methods for preparing such materials, are described in the microbattery examples hereinbelow. The electrolyte-filled walls comprise a porous separator layer between the anodes and the cathodes of the micro-battery. In particular, some of the pores traverse the entire thickness of walls 32, connecting anode and cathode micro-containers. Such through-pores enable ions to flow through them, as part of the electrochemical reaction in the microbattery. The porous separator thus provides electrical insulation (electron blocking) while allowing ion conduction between the electrodes. In some embodiments, parts of substrate 22 are oxidized before inserting the electrolyte, in order to enhance their electrical insulation.

Double-Sided Microbattery Fabrication Method

Figure 3:
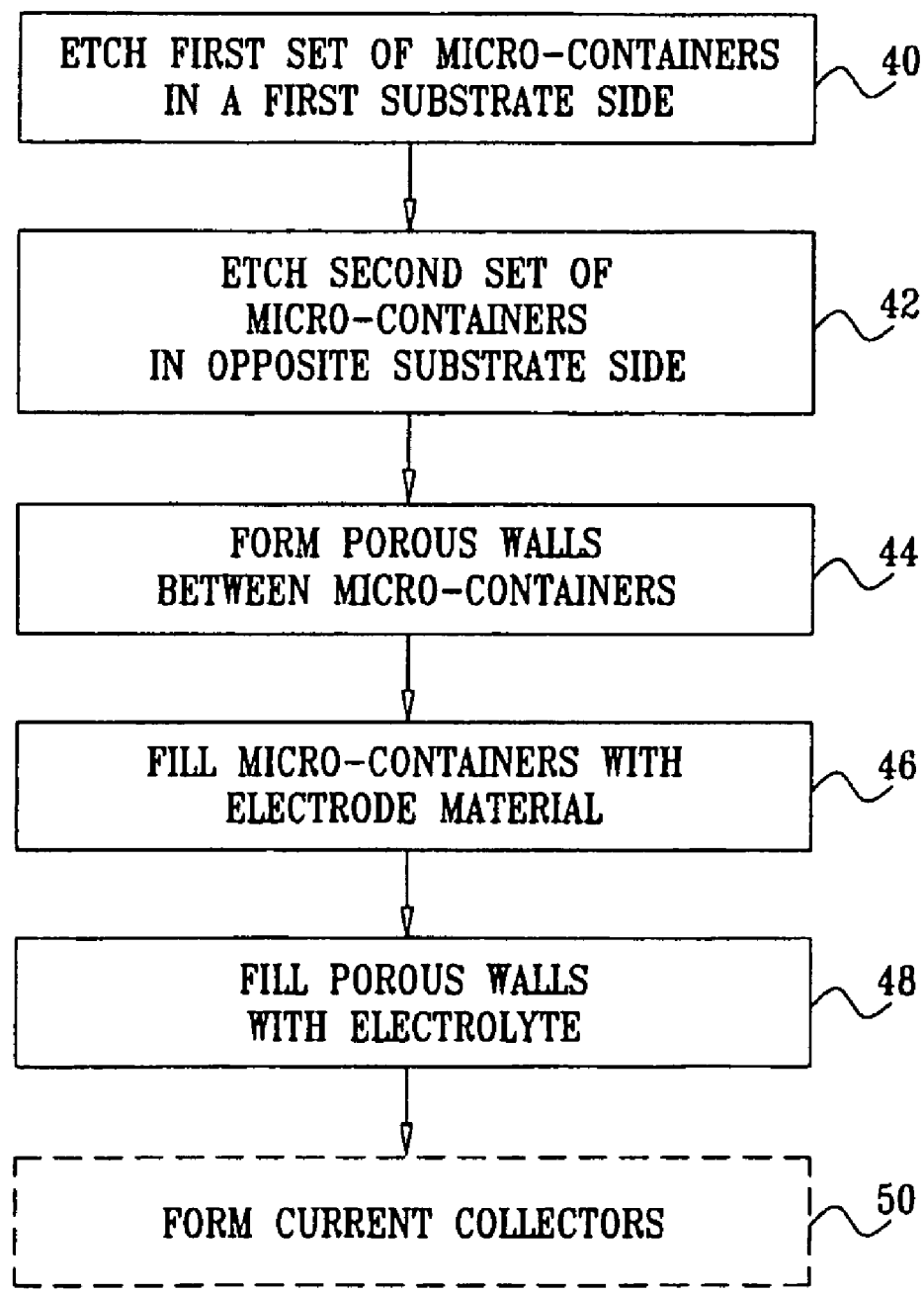
FIG. 3 is a flow chart that schematically illustrates a method for fabricating a microbattery, in accordance with an embodiment of the present invention.

FIG. 3 is a flow chart that schematically illustrates a method for fabricating microbattery 20, in accordance with an embodiment of the present invention. The method begins by forming a first set of micro-containers 24 in one side of substrate 22, at a first micro-container forming step 40. As described above, step 40 typically comprises a suitable etching and/or lithography process. The depth of the cavities is controlled, so that the micro-containers do not penetrate the opposite surface of the substrate. Similarly, a second set of micro-containers is formed in the opposite surface of the substrate, at a second micro-container forming step 42. The micro-containers are separated by thin walls, typically several microns thick.

Walls 32 are made porous, at a pore formation step 44. In one embodiment, step 44 comprises a metal-assisted chemical etching process. In an exemplary process, substrate 22 is immersed in a $PdCl_2$ acidic solution (typically 0.564 mM) for five seconds. The substrate is then immersed in a freshly-prepared etching mixture comprising $H_2O_2$:Ethanol:HF (1:2:4) for 40-60 minutes. This process is typically performed at room temperature. In other embodiments, an electrochemical etching process is used. The electrochemical etching process typically comprises immersing the substrate in a suitable etch solution and applying an electric field across the substrate and the solution. An exemplary process of this sort is described in U.S. Provisional Patent Application 60/566,205 cited above. Alternatively, any other suitable method known in the art for producing porous structures can be used for producing pores in substrate 22.

The output of steps 40-44 is an interlaced structure of two sets of micro-containers, formed into the two opposite surfaces of substrate 22. The micro-containers are separated by thin, porous walls.

(In the alternative embodiment described above, in which the interlaced micro-container structure is fabricated using three bonded wafers, steps 40-44 are replaced by a process comprising forming through-holes in the middle wafer, forming pores in the walls that separate the micro-containers in the middle wafer, forming alternate sets of holes in the two side wafers, and bonding the two side wafers to opposite surfaces of the middle wafer.)

The two sets of micro-containers are filled with suitable electrode materials, at an electrode filling step 46. Porous walls 32 are then filled with electrolyte, at a separator filling step 48. Finally, current collectors 28 and 30 are applied, if necessary, to the surfaces of substrate 22, at a collector applying step 50.

In some embodiments, the order of steps 46 and 48 can be reversed, introducing the electrolyte before filling the electrode micro-containers.

Single-Sided Microbattery Structure

Figure 4:
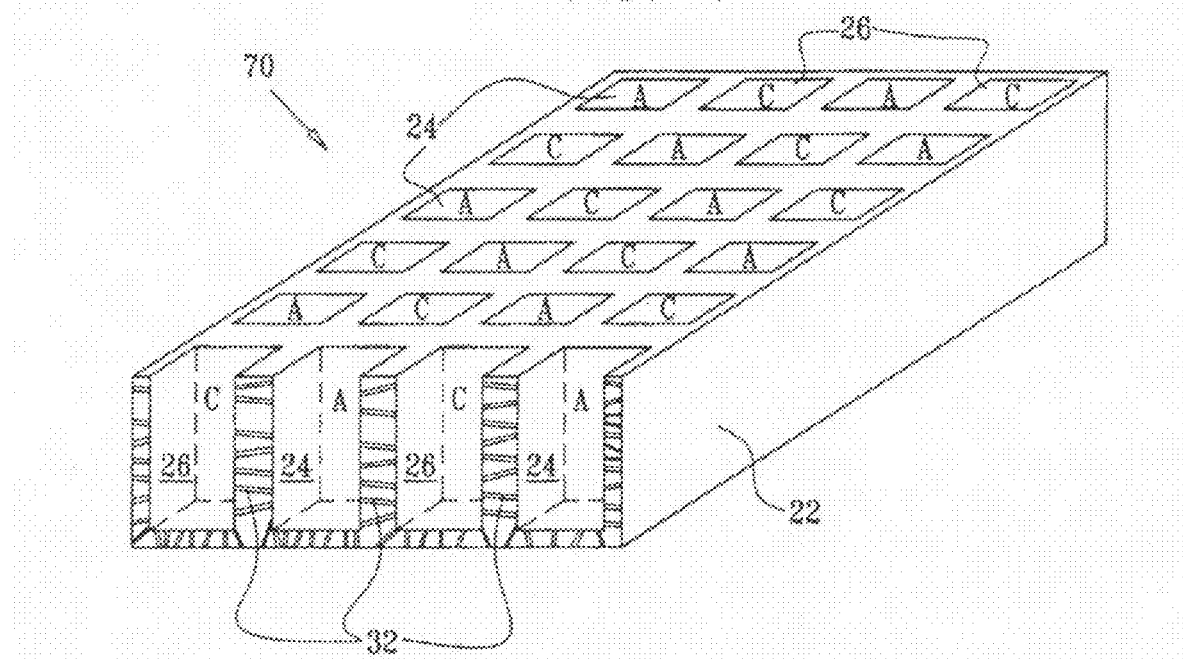
FIG. 4 is a pictorial, schematic illustration of a microbattery, in accordance with another embodiment of the present invention.

FIG. 4 is a pictorial, schematic illustration of a microbattery 70, in accordance with another embodiment of the present invention. Whereas microbattery 20 described above is formed on two surfaces of substrate 22, in some cases it is desirable to form a 3-D microbattery on a single side of the substrate. For example, in some cases the micro-battery is used to power a microcircuit formed on one surface of substrate 22. In such cases it is desirable to fit a microbattery structure into the opposite, unused surface of the substrate. In other cases, the substrate is too thick to enable a double-sided structure, such as the structure shown in FIGS. 1 and 2 above.

FIG. 4 shows a grid of micro-containers formed in one side of substrate 22. The micro-containers are divided into two interlaced sets 24 and 26, used as the anodes and cathodes of microbattery 70, respectively. The shapes, dimensions and pattern geometries of the micro-container sets 24 and 26 can use any suitable arrangement, as discussed in the description of FIG. 1.

The micro-containers can be formed using any suitable fabrication method, as described above. In some embodiments, the single-sided micro-container structure can be fabricated using two wafers. A first wafer comprises the two sets of micro-containers, which are allowed to penetrate through the entire thickness of the wafer. A second wafer, bonded to the first wafer, serves as the solid bottom of the micro-containers.

In other alternative embodiments, other structures such as interlaced comb-shaped, cochlear or spiral structures can be used as the electrodes of microbattery 70.

The micro-containers are separated by walls 32, typically several microns thick. The walls are made porous using any suitable method known in the art, including the methods described hereinabove. As in double-sided microbattery 20, the porous walls are made ion-conducting by filling them with a suitable electrolyte. In some embodiments, walls 32 are also rendered electrically-insulating by oxidation.

Figure 5:
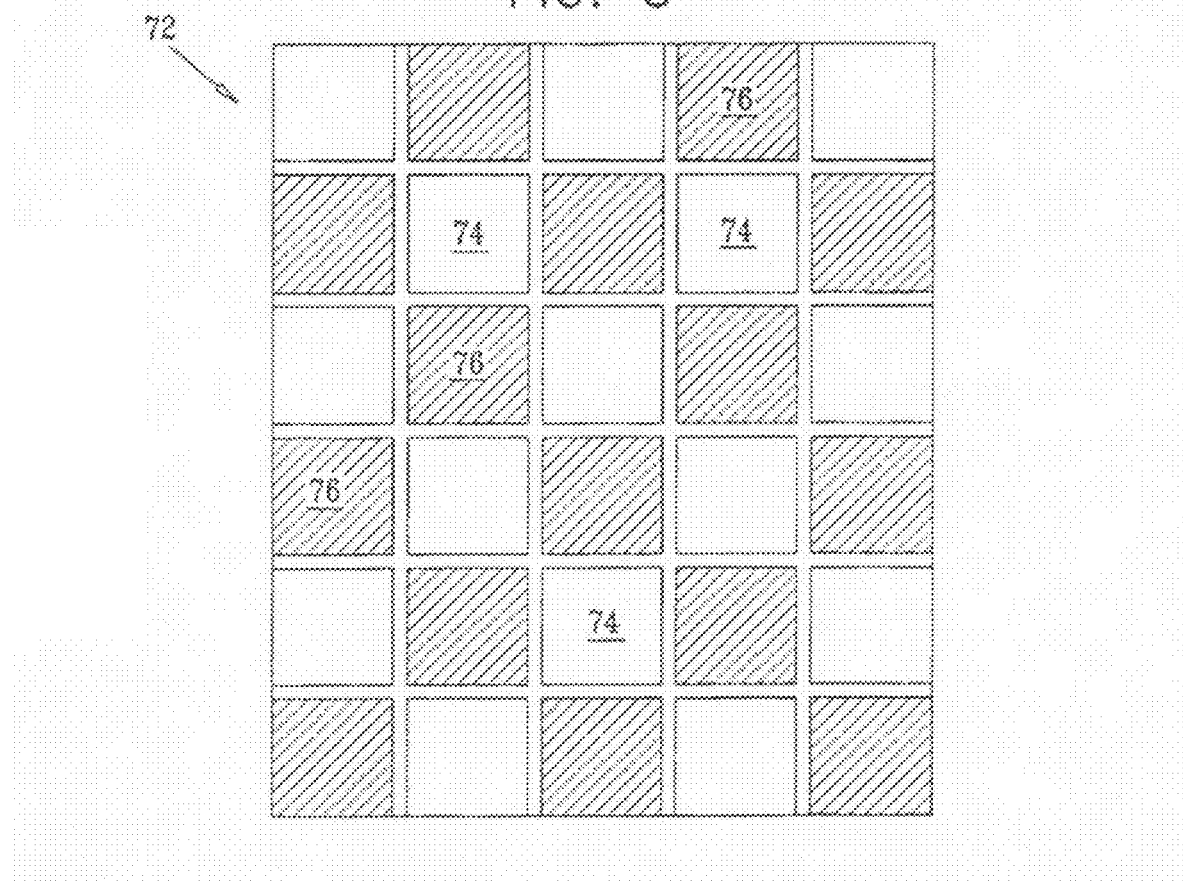
FIG. 5 is a schematic, top view of a mask used in the fabrication of a microbattery, in accordance with an embodiment of the present invention.

FIG. 5 is a schematic, top view of a mask 72 used in the fabrication of microbattery 70, in accordance with an embodiment of the present invention. Because both micro-container sets 24 and 26 are filled with respective anode and cathode materials from the same side of the substrate, it is desirable to use a mask for blocking one set of micro-containers while filling the other set. The use of mask 72 prevents mixing of the different electrode materials. Mask 72 comprises an alternating grid of openings 74 and blocked cells 76. The pattern of the openings and blocked cells of mask 72 is designed to match the pattern of anode and cathode micro-containers of microbattery 70.

When filling micro-containers 24 with anode material, mask 72 is placed over the surface of substrate 22 so that openings 74 coincide with micro-containers 24. The blocked cells coincide with micro-containers 26, thus preventing anode material from entering these micro-containers. Similarly, when filling micro-containers 26 with cathode material, the mask is placed so that openings 74 coincide with micro-containers 26 and blocked cells 76 protect micro-containers 24. After placing the mask, the micro-containers are filled with electrode material using any suitable method, as described above.

In one embodiment, two different masks are used, one mask for each set of micro-containers. Alternatively, a single mask can be used for filling both sets of micro-containers by changing the position of the mask. Mechanical translation and registration systems capable of positioning mask 72 with sufficient accuracy (typically on the order of 1 micron) are well known in the art. As noted above, the grid of micro-containers can take different shapes and configurations. Mask 72 is produced to match the micro-container grid used. Additionally or alternatively, before filling one set of micro-containers, the other set of micro-containers is filled with a temporary substance such as a polymeric compound. The filling prevents the wrong electrode material from entering the micro-containers. The temporary filling is subsequently removed.

After filling the anodes and cathodes with the appropriate electrode material, one or two current collectors (not shown in the figures) can be applied if necessary.

Single-Sided Microbattery Fabrication Method

Figure 6:
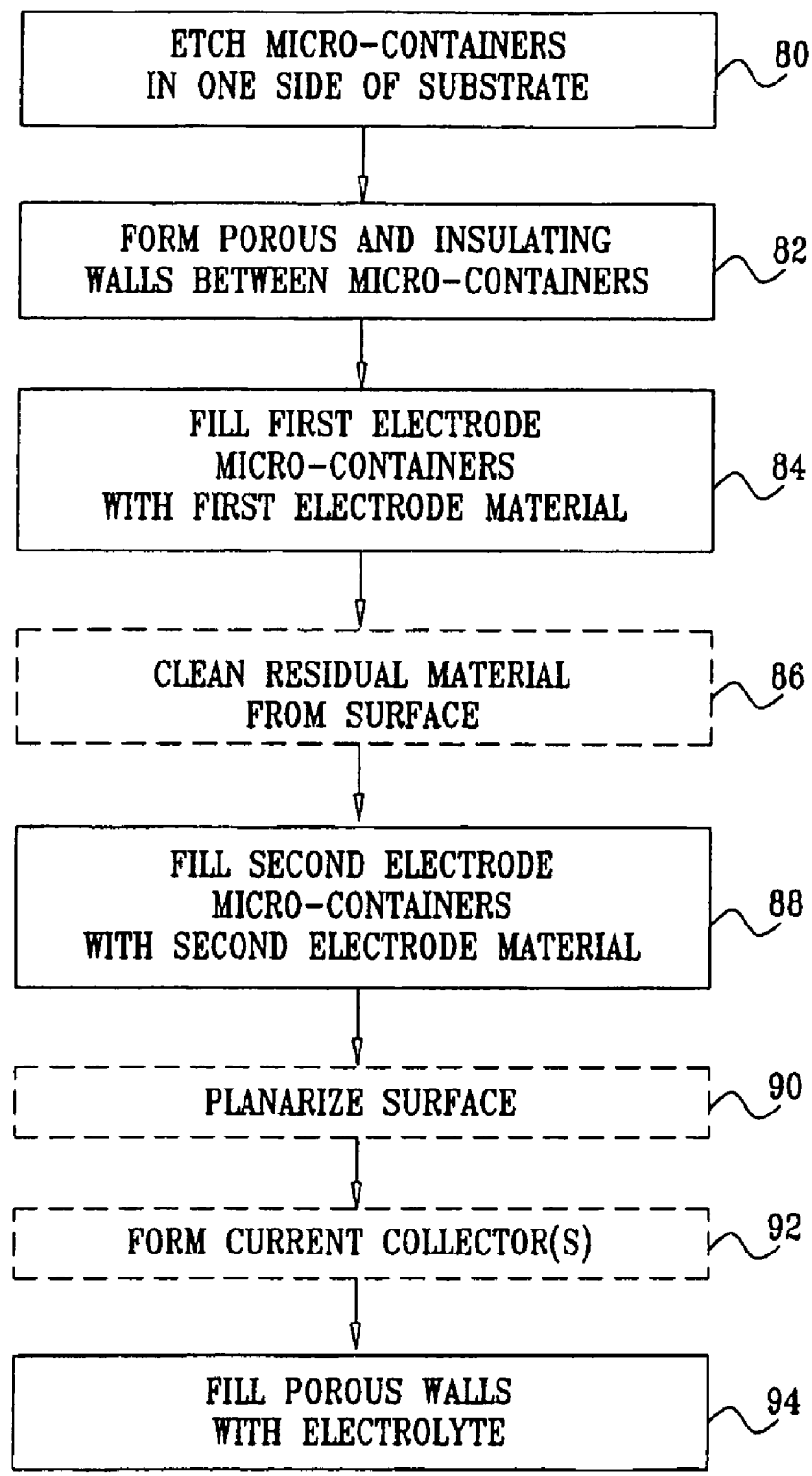
FIG. 6 is a flow chart that schematically illustrates a method for fabricating a microbattery, in accordance with an embodiment of the present invention.

FIG. 6 is a flow chart that schematically illustrates a method for fabricating microbattery 70, in accordance with an embodiment of the present invention. A pattern of micro-containers is formed in a single surface of substrate 22, at a single-side cavity forming step 80. The grid comprises the two sets of micro-containers 24 and 26. Walls 32 are made porous at a single-sided pore formation step 82. In some embodiments, the walls are also oxidized to make them electrically-insulating.

Micro-containers 24 are filled with an appropriate anode material, at an anode filling step 84. Mask 72 is placed over the substrate, as described above, to prevent anode material from entering micro-containers 26. Optionally, the surface of substrate 22 is cleaned to remove residual anode material, at a cleaning step 86. Micro-containers 26 are then filled with an appropriate cathode material, at a cathode filling step 88. Mask 72 is placed over the substrate so as to prevent cathode material from entering micro-containers 24. (The order of steps 84 and 88 can be reversed, filling the cathodes first and the anodes second.) Optionally, the surface of substrate 22 is cleaned and planarized, at a planarization step 90.

Optionally, one or two current collectors are applied or formed, at a current collector forming step 92. Finally, walls 32 are filled with an ion-conducting substance such as the exemplary substances described above, at an electrolyte filling step 94. In some embodiments step 94 can precede either or both steps 84 and 88, filling the porous layer with electrolyte before inserting the electrode materials.

Molded or Embossed Porous Separator

In an alternative embodiment (not shown in the figures), a thin and mechanically-stable porous separator membrane is "micro-molded" or "micro-embossed" into suitable recesses in substrate 22. Micro-molding and micro-embossing are well known techniques used in the fabrication of MEMS devices. This process replaces the micro-container etching process. In this alternative process, the porous membrane divides the recesses into small cavities, to produce micro-containers. The micro-containers are then filled with anode and cathode materials. After forming current collectors if necessary, the porous membrane is filled with an ion-conductive electrolyte. Porous polymers and plastic materials that may be used to implement the porous membrane are known in the art. Such materials are described, for example, by Heckele and Schomburg in "Review on Micromolding of Thermoplastic Polymers" Journal of Micromechanics and Microengineering, volume 14, 2004, pages R1-R14, which is incorporated herein by reference. The authors describe several thermoplastic polymers that have been used for micro-molding. Electrolytes based on two of these polymers, namely Polymethylmetacrylate (PMMA) and Polyvinylidenefluoride (PVDF), are described by Song et al., in "Review of Gel-Type Polymer Electrolytes for Lithium-Ion Batteries," Journal of Power Sources, volume 77, 1999, pages 183-197, which is incorporated herein by reference.

Integrated Microbattery and Microcircuit

One of the applications of microbatteries is to power a microelectronic circuit using a microbattery, which is fabricated on the same substrate as the microcircuit.

Figure 7A:
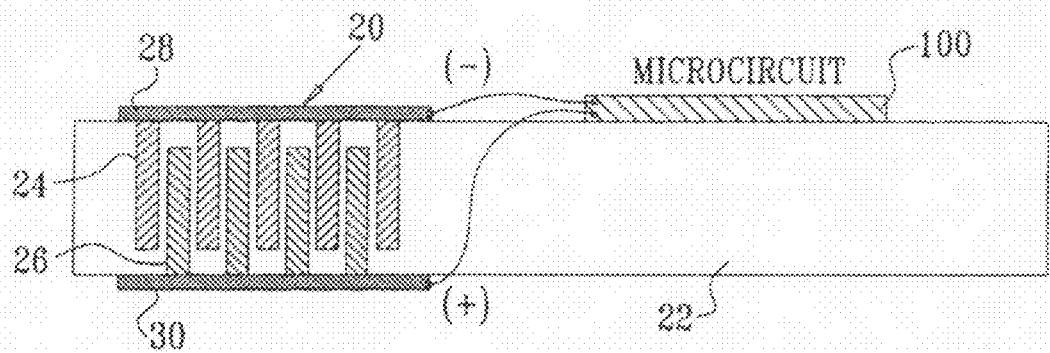
FIG. 7A is a schematic, sectional view of a microelectronic device, in accordance with an embodiment of the present invention.

FIG. 7A is a schematic, sectional view of a microelectronic device, in accordance with an embodiment of the present invention. The device comprises a microcircuit 100 fabricated on substrate 22. The microcircuit is powered by a double-sided 3-D microbattery, such as microbattery 20 described in FIGS. 1 and 2 above, which is fabricated in the same substrate.

Figure 7B:
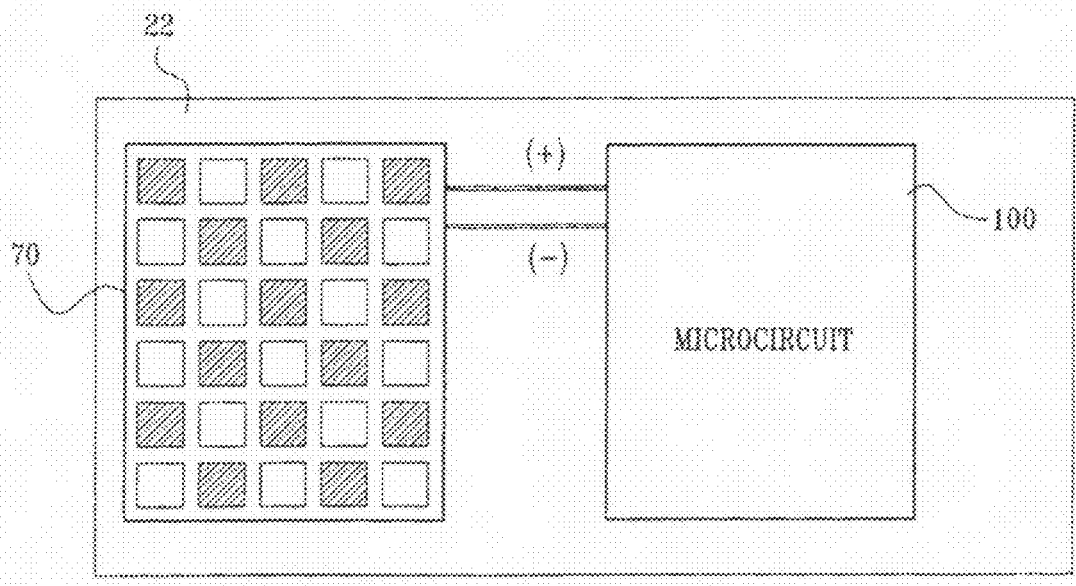
FIG. 7B is a schematic, top view of a microelectronic device, in accordance with another embodiment of the present invention.

FIG. 7B is a schematic, top view of a microelectronic device, in accordance with another embodiment of the present invention. As in FIG. 7A above, microcircuit 100 is fabricated on substrate 22. The microcircuit is powered by a single-sided microbattery, such as microbattery 70 described in FIG. 4 above, which is fabricated in the same substrate. FIG. 7B shows a configuration in which the battery is mounted on the same surface of the substrate, side-by-side with the microcircuit. Alternatively, the microbattery and the microcircuit can be fabricated on opposite surfaces of substrate 22, reducing the total area of the dye.

Exemplary Microbatteries

The following examples illustrate several possible 3-D microbattery implementations that can use the disclosed structures and methods.

EXAMPLE 1

A 3-D microbattery comprising lithium-ion anodes, hybrid-polymer electrolyte and $MoS_2$ cathodes can be fabricated in a silicon substrate. A double-sided interlaced structure of square 50×50 micron micro-containers, separated by 10-micron thick walls may be formed in a 500-micron thick silicon wafer using the process described in the Li paper cited above. The double-sided structure is similar to the structure shown in FIG. 1 above. The walls can be rendered porous by immersing the structure in a freshly-prepared etching mixture comprising $H_2O_2$:Ethanol:HF (1:2:4) for 40-60 minutes.

The porous double-sided interlaced structure is filled with a hybrid polymer electrolyte (HPE) membrane using, for example, a conventional casting process comprising vacuum filling. A PVDF-2801 copolymer (Kynar) can be used as a binder. Fumed silica can be used as filler for the polymer membrane. The PVDF powder is dissolved in high-purity cyclopentatone (Aldrich) or DMSO. Fumed Silica 130 (Degussa) and propylene carbonate (PC, Merck) are added. The mixture is stirred at room temperature for approximately 24 hours to produce a homogeneous slurry. The slurry is used to fill the through-pores connecting the anode and cathode micro-containers in the silicon substrate. After the solvent had evaporated completely, the cathode micro-containers are filled with $MoS_2$ powder bonded with polystyrene. The cathode material can be inserted by centrifuge.

The active anode material in this example may comprise lithiated graphite or a powder of passivated metallic lithium. To produce lithiated graphite, 2.5 mmol of naphthalene and some lithium foil are placed in 10 mL of 1-methoxybuthane. The mixture is stirred at 25° C. for approximately 24 hours under an atmosphere of dried argon, to produce a lithium-naphtalene-1-methoxybuthane (Li-NM) complex. The formation of the Li-NM complex can be confirmed by the solution changing color from clear to deep purple. After forming the complex, 0.2 grams of graphite flakes, wrapped in a stainless net, are inserted and the intercalation started. The solution may be stirred for approximately one week.

The retained solid is filtered and washed with hexane. Distilled water is slowly added to the solution. A known volume of LiOH, in aqueous phase, is titrated with HCl. The calculated number of moles of LiOH is subtracted from the initial number of moles of Li-NM, to give the actual number of moles of intercalated lithium. The lithiated graphite is mixed with polystyrene and inserted into the anode micro-containers, for example by using the same methods used to insert the cathode material above.

Current collectors can be connected at this stage. The porous membrane is then filled with liquid LiImide-ethylene carbonate (EC):dimethyl carbonate (DMC) 1:1 (v/v) electrolyte. When filling the polymer membrane with liquid electrolyte, a gel polymer electrolyte is produced.

The expected voltage cut-off for this battery is 1.3-2.4 volts. The charge/discharge current density is expected to be in the range 10-100 $\mu A/cm^2$.

EXAMPLE 2

A single-sided 3-D microbattery comprising lithium-ion anodes, hybrid-polymer electrolyte and $MoS_2$ cathodes can be fabricated in a silicon substrate. For example, a single-sided interlaced structure of square 50×50 micron micro-containers, separated by 10-micron thick walls may be formed in a 400-micron thick silicon wafer using the process described in the Kleimann paper cited above. The single-sided structure is similar to the structure shown in FIG. 4 above. As in example 1 above, the walls can be rendered porous by immersing the structure in a freshly-prepared etching mixture comprising $H_2O_2$:Ethanol:HF (1:2:4) for 40-60 minutes. The filling of alternate sets of cathode and anode micro-containers may be performed by masking the opposite set while filling in the respective electrode material.

EXAMPLE 3

A 3-D microbattery comprising lithium-ion anodes, hybrid-polymer electrolyte and $FeS_2$ cathodes can be fabricated in a silicon substrate. Preparation of the substrate and filling of the porous silicon with HPE can be performed in a similar manner to example 1 above. A pyrite-based cathode material can be prepared by dispersion of $FeS_2$ powder with LiImide $P(EO)_{20}$ polymer electrolyte in acetonytrile. The components may be thoroughly mixed for several hours to produce a homogeneous slurry. The cathode micro-containers are filled with cathode material using, for example, a conventional spin-coating process. The anode material may comprise lithiated graphite, as described in example 1 above.

The voltage cut-off of this microbattery is expected to be in the range of 1.1-2.1 volts. Charge/discharge current density is expected to be approximately 40 $\mu A/cm^2$.

EXAMPLE 4

The microbattery of the present example is similar to example 1. In the present example, however, the cathode and anode materials are first inserted into the micro-containers. Only then, the liquid electrolyte is inserted, for example using vacuum, into the porous walls of the silicon substrate. The insertion can be performed from both surfaces of the substrate, by using a porous structure that extends between the two surfaces along the walls. The voltage cut-off of the microbattery is expected to be in the range 1.3-2.4 volts. Charge/discharge current density is expected to be approximately 50 $\mu A/cm^2$.

EXAMPLE 5

A microbattery similar to example 1 may be fabricated with $WS_2$ used as cathode material.

EXAMPLE 6

A microbattery comprising lithium-ion anodes, liquid or HPE electrolyte, and $LiCoO_2$ cathodes can be fabricated in a silicon substrate. Different types of graphite, such as mesocarbon microbeads (MCMB), natural, synthetic or expanded graphite may be used as lithium intercalation host materials. In one embodiment, the microbattery is fabricated in a fully-discharged state. Filling of the micro-containers typically follows the method described in Example 1 above. The expected voltage cut-off is in the range 3.0-4.2 volts and the expected charge/discharge current density is in the range 0.1-10 $\mu A/cm^2$.

EXAMPLE 7

A microbattery similar to example 5 may be fabricated with cathode material comprising $Li_{1+x}Mn_{2-y}O_4$.

The expected voltage cut-off of this battery is in the range of 3.5-5.3 volts, and the charge/discharge current density is expected to be in the range of 0.1-10 $\mu A/cm^2$.

EXAMPLE 8

A 3-D microbattery comprising lithium-ion anodes, composite polymer electrolyte (CPE) and $MoS_2$ cathodes can be fabricated in a silicon substrate. The cathode material may be prepared in a similar manner to example 1 above. A 10-20 micron thick film composite polymer electrolyte (CPE), comprising a composition of $LiImide_1$ $P(EO)_{20}$ $EC_1$ 9% (v/v) $Al_2O_3$, is prepared from 45 mg LiImide, 300 mg P(EO), 30 mg EC and 100 mg $Al_2O_3$. Polyethylene P(EO) (Aldrich), having an average molecular weight of $5\times10^6$, is vacuum-dried at 45-50° C. for approximately 24 hours. A polymer slurry can be prepared by dispersing known quantities of P(EO), LiImide and ethylene carbonate (EC) in analytical grade acetonitrile, together with the required amount of an inorganic filler, such as $Al_2O_3$ (Buehler), having an average diameter of approximately 150 Å. To ensure the formation of a homogeneous suspension, a high-speed homogenizer can be used. The suspension may be stirred for approximately 24 hours. The CPE films are then cast on the 3-D substrate.

Vacuum and spin coating processes can be used to fill the through pores with the polymer electrolyte.

The current density of this battery is expected to be around 50 μA/cm². The voltage cutoff on discharge is expected to be around 1.1 volts. The voltage cutoff on charge is expected to be around 2.2 volts.

EXAMPLE 9

A 3-D microbattery comprising lithium anodes, a liquid or composite HPE and $MoS_2$ cathodes may be fabricated. The anode micro-containers are filled with molten lithium at approximately 185° C. The cathodes and HPE may be prepared in a similar manner to example 1 above. The Faradic efficiency of the microbattery is expected to approach 100%.

Although the methods and devices described herein mainly address the fabrication of 3-D microbatteries, the principles of the present invention can also be used to fabricate other energy storage devices, such as capacitors, using interlaced sets of micro-containers and a porous separator.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. An electrical energy storage device, comprising:
a substrate, which is formed so as to define a multiplicity of micro-containers separated by electrically-insulating and ion-conducting walls; and
a first plurality of anodes disposed in a first subset of the micro-containers, and a second plurality of cathodes disposed in a second subset of the micro-containers, the anodes and cathodes arranged in an interlaced pattern.

2. The device according to claim 1, wherein the walls have pores formed therethrough.

3. The device according to claim 2, wherein the walls comprise a porous separator membrane applied to the substrate using at least one of a micro-molding and a micro-embossing process.

4. The device according to claim 2, wherein at least some of the pores are filled with an electrolyte.

5. The device according to claim 4, wherein the electrolyte comprises at least one of a liquid electrolyte, a hybrid polymer electrolyte (HPE) and a composite polymer electrolyte (CPE).

6. The device according to claim 1, wherein the substrate comprises at least one of silicon, gallium arsenide, silicon carbide, a ceramic material, a thermoplastic polymer, a thermoplastic polymer, a surface-oxidized metal, a sodium-ion conductor and a lithium-ion conductor.

7. The device according to claim 1, wherein the first and second subsets of the micro-containers are formed in a single surface of the substrate.

8. The device according to claim 1, wherein the first and second subsets of micro-containers are formed in respective opposite surfaces of the substrate.

9. The device according to claim 1, and comprising at least one current collector coupled to at least one of the plurality of anodes and the plurality of cathodes.

10. The device according to claim 1, wherein the micro-containers have a depth-to-diameter ratio greater than one.

11. A microelectronic device, comprising:
a substrate;
a microcircuit disposed on the substrate; and
an electrical energy storage device disposed in the substrate and coupled to provide electrical power to the microcircuit, the storage device comprising:
a multiplicity of three-dimensional micro-containers formed in the substrate, separated by electrically-insulating and ion-conducting walls; and
a plurality of anodes disposed in a first subset of the micro-containers, and a plurality of cathodes disposed in a second subset of the micro-containers, the anodes and cathodes arranged in an interlaced pattern.

12. The device according to claim 11, wherein the walls have pores formed therethrough.

13. The device according to claim 12, wherein the walls comprise a porous separator membrane applied to the substrate using at least one of a micro-molding and a micro-embossing process.

14. The device according to claim 12, wherein at least some of the pores are filled with an electrolyte.

15. The device according to claim 14, wherein the electrolyte comprises at least one of a liquid electrolyte, a hybrid polymer electrolyte (HPE) and a composite polymer electrolyte (CPE).

16. The device according to claim 11, wherein the substrate comprises at least one of silicon, gallium arsenide, silicon carbide, a ceramic material, a thermoplastic polymer, a thermoplastic polymer, a surface-oxidized metal, a sodium-ion conductor and a lithium-ion conductor.

17. The device according to claim 11, wherein the first and second subsets of the micro-containers are formed in a single surface of the substrate.

18. The device according to claim 11, wherein the first and second subsets of micro-containers are formed in respective opposite surfaces of the substrate.

19. The device according to claim 11, and comprising at least one current collector coupled to at least one of the plurality of anodes and the plurality of cathodes.

20. The device according to claim 11, wherein the micro-containers have a depth-to-diameter ratio greater than one.

21. A method for constructing an electrical energy storage device, comprising:
forming a multiplicity of three-dimensional micro-containers in a substrate, so that the micro-containers are separated by electrically-insulating and ion-conducting walls; and
disposing a first plurality of anodes in a first subset of the micro-containers, and a second plurality of cathodes in a second subset of the micro-containers, the anodes and cathodes arranged in an interlaced pattern.

22. The method according to claim 21, wherein forming the multiplicity of micro-containers comprises forming pores through the separating walls.

23. The method according to claim 22, wherein forming the multiplicity of micro-containers comprises filling at least some of the pores with an electrolyte.

* * * * *